(12) United States Patent
Sameer

(10) Patent No.: US 12,154,327 B2
(45) Date of Patent: Nov. 26, 2024

(54) METHOD, APPARATUS, AND COMPUTER PROGRAM PRODUCT FOR IDENTIFYING FLUID LEAKS BASED ON AERIAL IMAGERY

(71) Applicant: HERE GLOBAL B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 352 days.

(21) Appl. No.: 17/647,116

(22) Filed: Jan. 5, 2022

(65) Prior Publication Data

US 2023/0215165 A1 Jul. 6, 2023

(51) Int. Cl.
  *G06V 20/17* (2022.01)
  *G06T 7/507* (2017.01)
  *G06V 20/10* (2022.01)

(52) U.S. Cl.
  CPC .............. *G06V 20/17* (2022.01); *G06T 7/507* (2017.01); *G06V 20/176* (2022.01)

(58) Field of Classification Search
  CPC ........ G06V 20/17; G06V 20/52; G06V 20/49; G06T 7/507; G06T 2207/10032; G06T 2207/30184; G06T 15/60
  See application file for complete search history.

(56) References Cited

U.S. PATENT DOCUMENTS

| | | | |
|---|---|---|---|
| 9,230,308 B2 * | 1/2016 | Ma | G06T 5/50 |
| 10,762,681 B2 | 9/2020 | Sameer | |
| 10,943,357 B2 * | 3/2021 | Badawy | G06T 7/254 |
| 2014/0294232 A1 * | 10/2014 | Ju | G06T 5/77 |
| | | | 382/103 |

(Continued)

FOREIGN PATENT DOCUMENTS

| | | | | |
|---|---|---|---|---|
| CN | 109241851 A | * | 1/2019 | ......... G06K 9/00771 |
| CN | 107977968 B | * | 3/2021 | ......... G06K 9/00637 |

(Continued)

OTHER PUBLICATIONS

Jang, S. Lim and H. Jeon, "Change Detection in Unmanned Aerial Vehicle Images for Industrial Infrastructure Rooftop Monitoring," 2022 19th International Conference on Ubiquitous Robots (UR), Jeju, Korea, Republic of, 2022, pp. 274-279, doi: 10.1109/UR55393. 2022.9826274. (Year: 2022).*

(Continued)

*Primary Examiner* — Michael Robert Cammarata

(57) ABSTRACT

A method, apparatus, and computer program product are provided for using aerial imagery to identify and distinguish fluid leaks from objects, structures, and shadows in aerial imagery. A method may include: receiving an aerial image of a geographic region; identifying objects within the aerial image; determining shadow areas associated with the objects within the aerial image; determining whether areas exist contiguous with the shadow areas and extending beyond the shadow areas; identifying one or more fluid leaks in (Continued)

response to areas existing contiguous with the shadow areas and extending beyond the shadow areas; and generating an indication of the one or more fluid leaks including one or more locations of the one or more fluid leaks.

20 Claims, 7 Drawing Sheets

(56) References Cited

U.S. PATENT DOCUMENTS

| | | | |
|---|---|---|---|
| 2016/0055653 A1* | 2/2016 | Badawy | G06T 7/90 |
| | | | 348/143 |
| 2017/0192424 A1* | 7/2017 | Poole | G06F 18/214 |
| 2019/0003984 A1* | 1/2019 | Kester | G06V 20/52 |
| 2019/0025423 A1* | 1/2019 | Sajwaj | G01S 13/867 |
| 2020/0035004 A1* | 1/2020 | Sameer | G06T 11/60 |
| 2020/0302644 A1* | 9/2020 | Sameer | G06T 7/55 |
| 2020/0348183 A1* | 11/2020 | Agarwal | G01J 5/12 |
| 2020/0356119 A1 | 11/2020 | Javey | |
| 2021/0192631 A1 | 6/2021 | Coonrod et al. | |
| 2022/0038644 A1* | 2/2022 | McAllister | G06V 20/194 |
| 2022/0254004 A1* | 8/2022 | Shayne | G06V 20/52 |
| 2022/0374634 A1* | 11/2022 | Sameer | G06T 7/12 |
| 2023/0194418 A1* | 6/2023 | Asano | G01M 3/002 |
| | | | 382/103 |
| 2023/0260098 A1* | 8/2023 | Horita | G06Q 10/00 |
| | | | 345/419 |

FOREIGN PATENT DOCUMENTS

| | | | |
|---|---|---|---|
| CN | 113111866 A | * | 7/2021 |
| KR | 102259752 B1 | * | 6/2021 |

OTHER PUBLICATIONS

A. O. Ok, "A New Approach for the Extraction of Aboveground Circular Structures From Near-Nadir VHR Satellite Imagery," in IEEE Transactions on Geoscience and Remote Sensing, vol. 52, No. 6, pp. 3125-3140, Jun. 2014, doi: 10.1109/TGRS.2013.2270372. (Year: 2014).*

B. Sirmacek and C. Unsalan, "Damaged building detection in aerial images using shadow Information," 2009 4th International Conference on Recent Advances in Space Technologies, Istanbul, Turkey, 2009, pp. 249-252, doi: 10.1109/RAST.2009.5158206. (Year: 2009).*

Z. Chen and T. Hutchinson, "A probabilistic classification framework for urban structural damage estimation using satellite images," Urban Remote Sensing Joint Event 2007, pp. 1-7, 2007. (Year: 2007).*

R. B. Irvin and D. M. McKeown, "Methods for exploiting the relationship between buildings and their shadows in aerial imagery," in IEEE Transactions on Systems, Man, and Cybernetics, vol. 19, No. 6, pp. 1564-1575, Nov.-Dec. 1989, doi: 10.1109/21.44071. (Year: 1989).*

M. Yahia, R. Gawai, T. Ali, M. M. Mortula, L. Albasha and T. Landolsi, "Non-Destructive Water Leak Detection Using Multitemporal Infrared Thermography," in IEEE Access, vol. 9, pp. 72556-72567, 2021, doi: 10.1109/ACCESS.2021.3078415. (Year: 2021).*

Chen et al., "Aerial Imagery for Roof Segmentation: A Large-Scale Dataset Towards Automatic Mapping of Buildings", arXiv 1807.09532, (Sep. 2018), 17 pages.

"Detecting Leaks with Satellite Imagery", [Retrieved on Oct. 20, 2021], Retrieved from the Internet: <URL:https://www.wwdmag.com/leak-detectors/detecting-leaks-satellite-imagery>., 3 pages.

* cited by examiner

METHOD, APPARATUS, AND COMPUTER PROGRAM PRODUCT FOR IDENTIFYING FLUID LEAKS BASED ON AERIAL IMAGERY

TECHNOLOGICAL FIELD

An example embodiment of the present invention relates to identifying fluid leaks based on aerial imagery, and more particularly, to using aerial imagery to identify and distinguish fluid leaks from objects, structures, and shadows in aerial imagery.

BACKGROUND

Capturing a "bird's eye view" of an area used to rely on aircraft flying over an area and capturing still images in photographs of the area below the aircraft. These images were difficult and costly to obtain such that initially they were limited to governmental and military use. Further, the image quality was relatively low, such that object identification in these photographs was difficult. Advances in camera technology led to the development of high-altitude photography, such as with the Lockheed U-2 spy plane capturing images from 90,000 feet at high resolution. Further advances have led to satellite-based aerial image capture, and as digital imagery has progressed, objects in these high-resolution digital satellite images have become discernable. The modern ubiquity of high-resolution aerial imagery has led to the use of such images in a variety of applications. Object detection in aerial imagery is used for global information services, construction planning, wildlife tracking, and a variety of other applications.

BRIEF SUMMARY

A method, apparatus, and computer program product are provided in accordance with an example embodiment described herein for identifying fluid leaks based on aerial imagery, and more particularly, to using aerial imagery to identify and distinguish fluid leaks from objects, structures, and shadows in aerial imagery. Embodiments provided herein may include an apparatus having at least one processor and at least one memory including computer program code, the at least one memory and computer program code may be configured to, with the processor, cause the apparatus to at least: receive an aerial image of a geographic region; identify objects within the aerial image; determine shadow areas associated with the objects within the aerial image; determine whether areas exist contiguous with the shadow areas and extending beyond the shadow areas; identify one or more fluid leaks in response to areas existing contiguous with the shadow areas and extending beyond the shadow areas; and generate an indication of the one or more fluid leaks including one or more locations of the one or more fluid leaks.

According to some embodiments, the aerial image of the geographic region includes an image of a building, where causing the apparatus to identify objects within the aerial image includes causing the apparatus to identify rooftop objects on a roof of the building within the aerial image. Causing the apparatus to determine shadow areas associated with the objects within the aerial image include, in some embodiments, causing the apparatus to determine shadow areas associated with the rooftop objects based on image analysis of the rooftop objects. Causing the apparatus of some embodiments to determine whether areas exist contiguous with the shadow areas and extending beyond the shadow areas includes causing the apparatus to determine whether areas exist contiguous with the shadow areas and extending beyond the shadow areas relative to one or more baseline aerial images of the geographic region.

According to some embodiments, causing the apparatus to identify the one or more fluid leaks in response to areas existing contiguous with the shadow areas and extending beyond the shadow areas includes causing the apparatus to identify a severity of the one or more fluid leaks based on a degree to which the areas existing contiguous with the shadow areas extend beyond the shadow areas. Causing the apparatus of some embodiments to generate the indication of the one or more fluid leaks including one or more locations of the one or more fluid leaks includes causing the apparatus to generate an indication of the one or more fluid leaks including the one or more locations of the one or more fluid leaks and the severity of the one or more fluid leaks. Causing the apparatus to generate an indication of the one or more fluid leaks including one or more locations of the one or more fluid leaks includes, in some embodiments, causing the apparatus to provide for display of the aerial image of the geographic region including an indication of the one or more locations of the one or more fluid leaks on a user interface.

Embodiments provided herein include a computer program product including at least one non-transitory computer-readable storage medium having computer-executable program code portions stored therein, the computer-executable program code portions including program code instructions configured to: receive an aerial image of a geographic region; identify objects within the aerial image; determine shadow areas associated with the objects within the aerial image; determine whether areas exist contiguous with the shadow areas and extending beyond the shadow areas; identify one or more fluid leaks in response to areas existing contiguous with the shadow areas and extending beyond the shadow areas; and generate an indication of the one or more fluid leaks including one or more locations of the one or more fluid leaks.

According to some embodiments, the aerial image of the geographic region includes an image of a building, where the program code instructions to identify objects within the aerial image include program code instructions to identify rooftop objects on a roof of the building within the aerial image. The program code instructions to determine shadow areas associated with the objects within the aerial image include, in some embodiments, program code instructions to determine shadow areas associated with the rooftop objects based on image analysis of the rooftop objects. The program code instructions of some embodiments to determine whether areas exist contiguous with the shadow areas and extending beyond the shadow areas include program code instructions to determine whether areas exist contiguous with the shadow areas and extending beyond the shadow areas relative to one or more baseline aerial images of the geographic region.

According to some embodiments, the program code instructions to identify the one or more fluid leaks in response to areas existing contiguous with the shadow areas and extending beyond the shadow areas include program code instructions to identify a severity of the one or more fluid leaks based on a degree to which the areas existing contiguous with the shadow areas extend beyond the shadow areas. The program code instructions of some embodiments to generate the indication of the one or more fluid leaks including one or more locations of the one or more fluid leaks include program code instructions to generate an indication of the one or more fluid leaks including the one or more locations of the one or more fluid leaks and the severity of the one or more fluid leaks. The program code instructions to generate an indication of the one or more fluid leaks including one or more locations of the one or more fluid leaks includes, in some embodiments, program code instructions to provide for display of the aerial image of the geographic region including an indication of the one or more locations of the one or more fluid leaks on a user interface.

Embodiments provided herein include a method including: receiving an aerial image of a geographic region; identifying objects within the aerial image; determining shadow areas associated with the objects within the aerial image; determining whether areas exist contiguous with the shadow areas and extending beyond the shadow areas; identifying one or more fluid leaks in response to areas existing contiguous with the shadow areas and extending beyond the shadow areas; and generating an indication of the one or more fluid leaks including one or more locations of the one or more fluid leaks.

According to some embodiments, the aerial image of the geographic region includes an image of a building, where identifying objects within the aerial image includes identifying rooftop objects on a roof of the building within the aerial image. Determining shadow areas associated with the objects within the aerial image include, in some embodiments, determining shadow areas associated with the rooftop objects based on image analysis of the rooftop objects. Determining whether areas exist contiguous with the shadow areas and extending beyond the shadow areas includes, in some embodiments, determining whether areas exist contiguous with the shadow areas and extending beyond the shadow areas relative to one or more baseline aerial images of the geographic region.

According to some embodiments, identifying the one or more fluid leaks in response to areas existing contiguous with the shadow areas and extending beyond the shadow areas includes identifying a severity of the one or more fluid leaks based on a degree to which the areas existing contiguous with the shadow areas extend beyond the shadow areas. Generating the indication of the one or more fluid leaks including one or more locations of the one or more fluid leaks includes, in some embodiments, generating an indication of the one or more fluid leaks including the one or more locations of the one or more fluid leaks and the severity of the one or more fluid leaks. Generating an indication of the one or more fluid leaks including one or more locations of the one or more fluid leaks includes, in some embodiments, providing for display of the aerial image of the geographic region including an indication of the one or more locations of the one or more fluid leaks on a user interface.

Embodiments provided herein include an apparatus including: means for receiving an aerial image of a geographic region; means for identifying objects within the aerial image; means for determining shadow areas associated with the objects within the aerial image; means for determining whether areas exist contiguous with the shadow areas and extending beyond the shadow areas; means for identifying one or more fluid leaks in response to areas existing contiguous with the shadow areas and extending beyond the shadow areas; and means for generating an indication of the one or more fluid leaks including one or more locations of the one or more fluid leaks.

According to some embodiments, the aerial image of the geographic region includes an image of a building, where the means for identifying objects within the aerial image includes means for identifying rooftop objects on a roof of the building within the aerial image. The means for determining shadow areas associated with the objects within the aerial image include, in some embodiments, means for determining shadow areas associated with the rooftop objects based on image analysis of the rooftop objects. The means for determining whether areas exist contiguous with the shadow areas and extending beyond the shadow areas includes, in some embodiments, means for determining whether areas exist contiguous with the shadow areas and extending beyond the shadow areas relative to one or more baseline aerial images of the geographic region.

According to some embodiments, the means for identifying the one or more fluid leaks in response to areas existing contiguous with the shadow areas and extending beyond the shadow areas includes means for identifying a severity of the one or more fluid leaks based on a degree to which the areas existing contiguous with the shadow areas extend beyond the shadow areas. The means for generating the indication of the one or more fluid leaks including one or more locations of the one or more fluid leaks includes, in some embodiments, means for generating an indication of the one or more fluid leaks including the one or more locations of the one or more fluid leaks and the severity of the one or more fluid leaks. The means for generating an indication of the one or more fluid leaks including one or more locations of the one or more fluid leaks includes, in some embodiments, means for providing for display of the aerial image of the geographic region including an indication of the one or more locations of the one or more fluid leaks on a user interface.

BRIEF DESCRIPTION OF THE DRAWINGS

Figure 1:
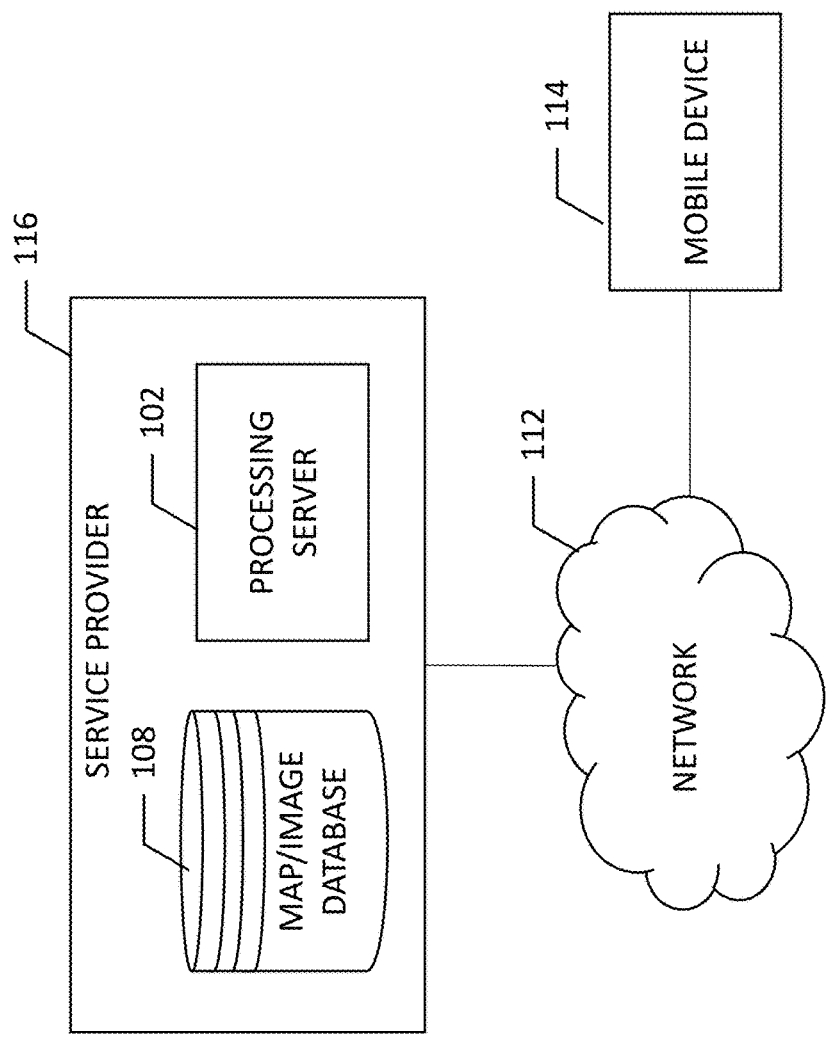
Figure 2:
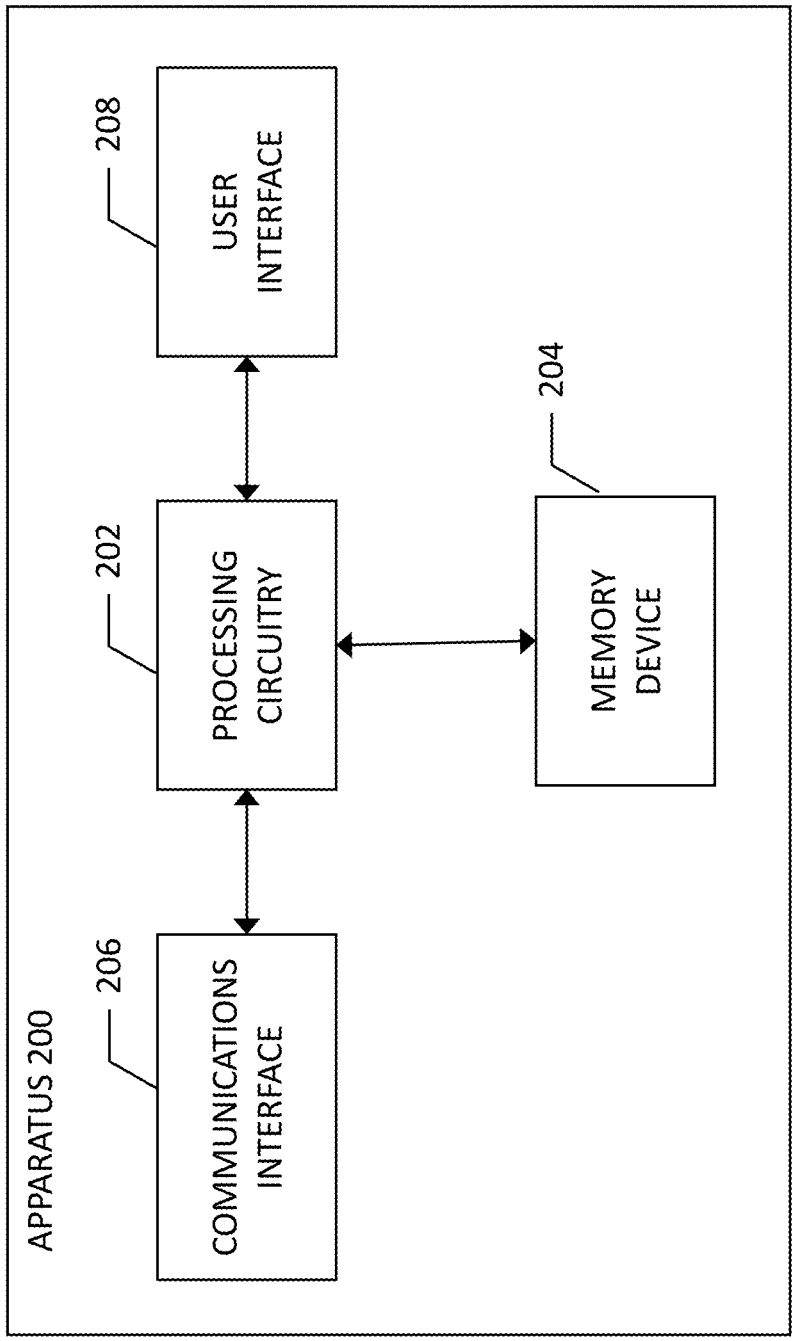
Figure 3:
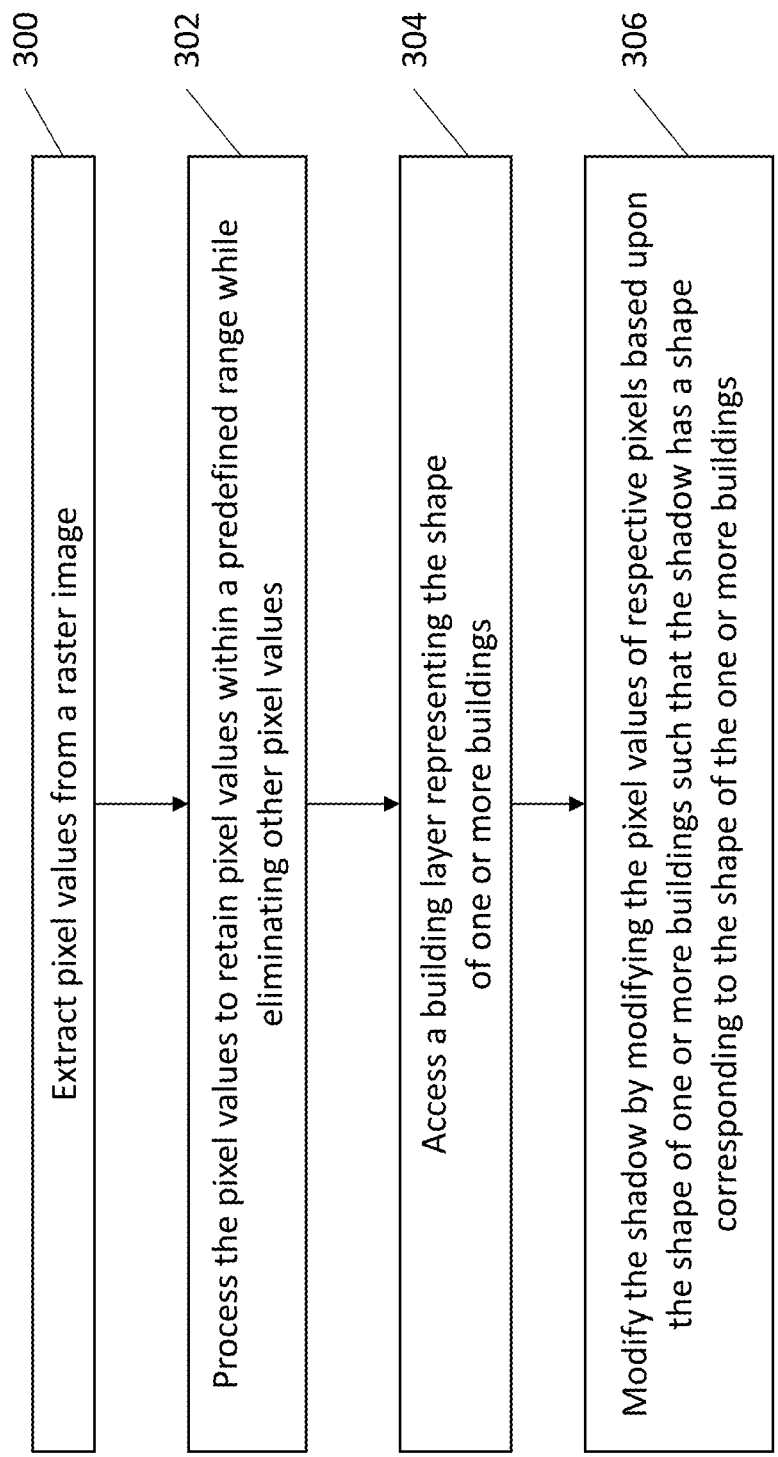
Figure 4:
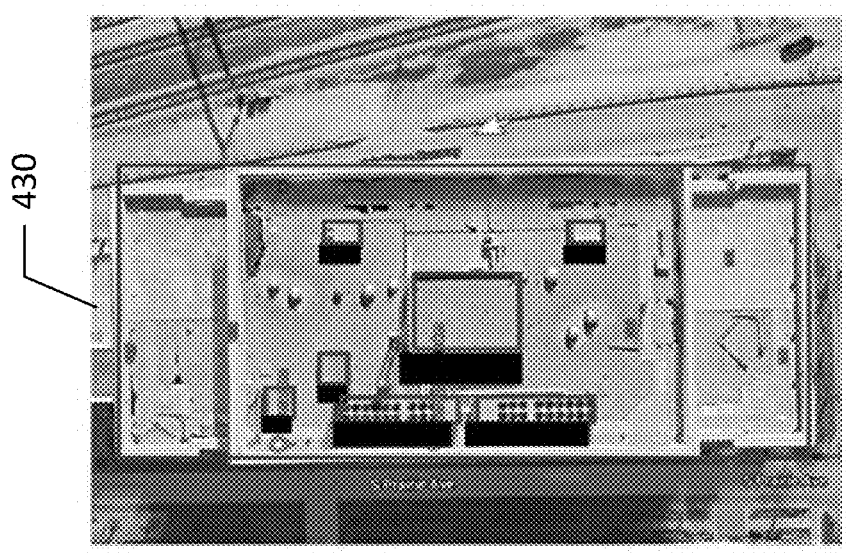
Figure 4:
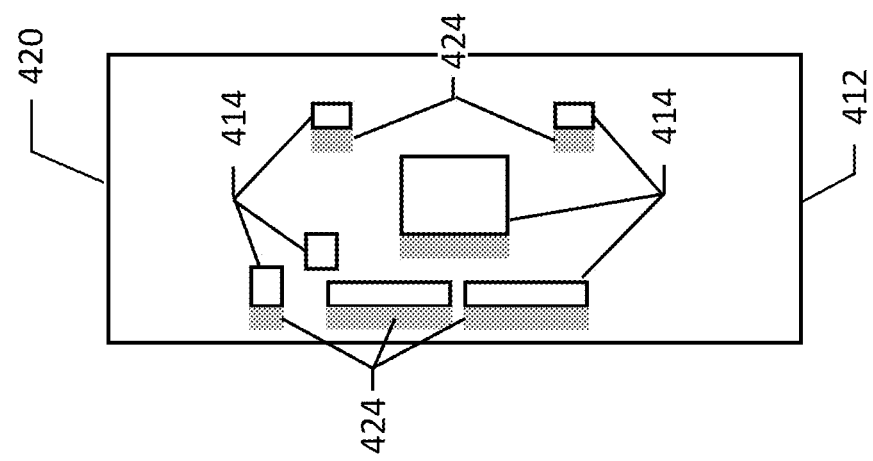
Figure 4:
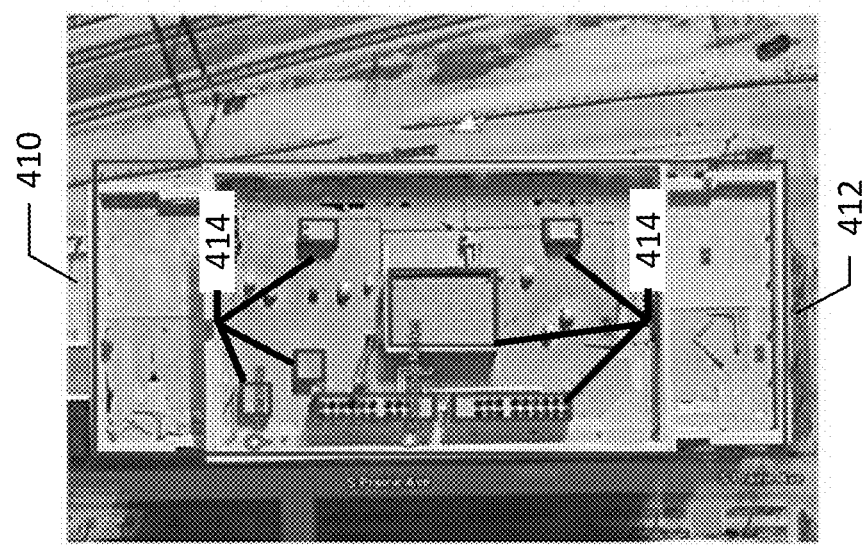
Figure 5:
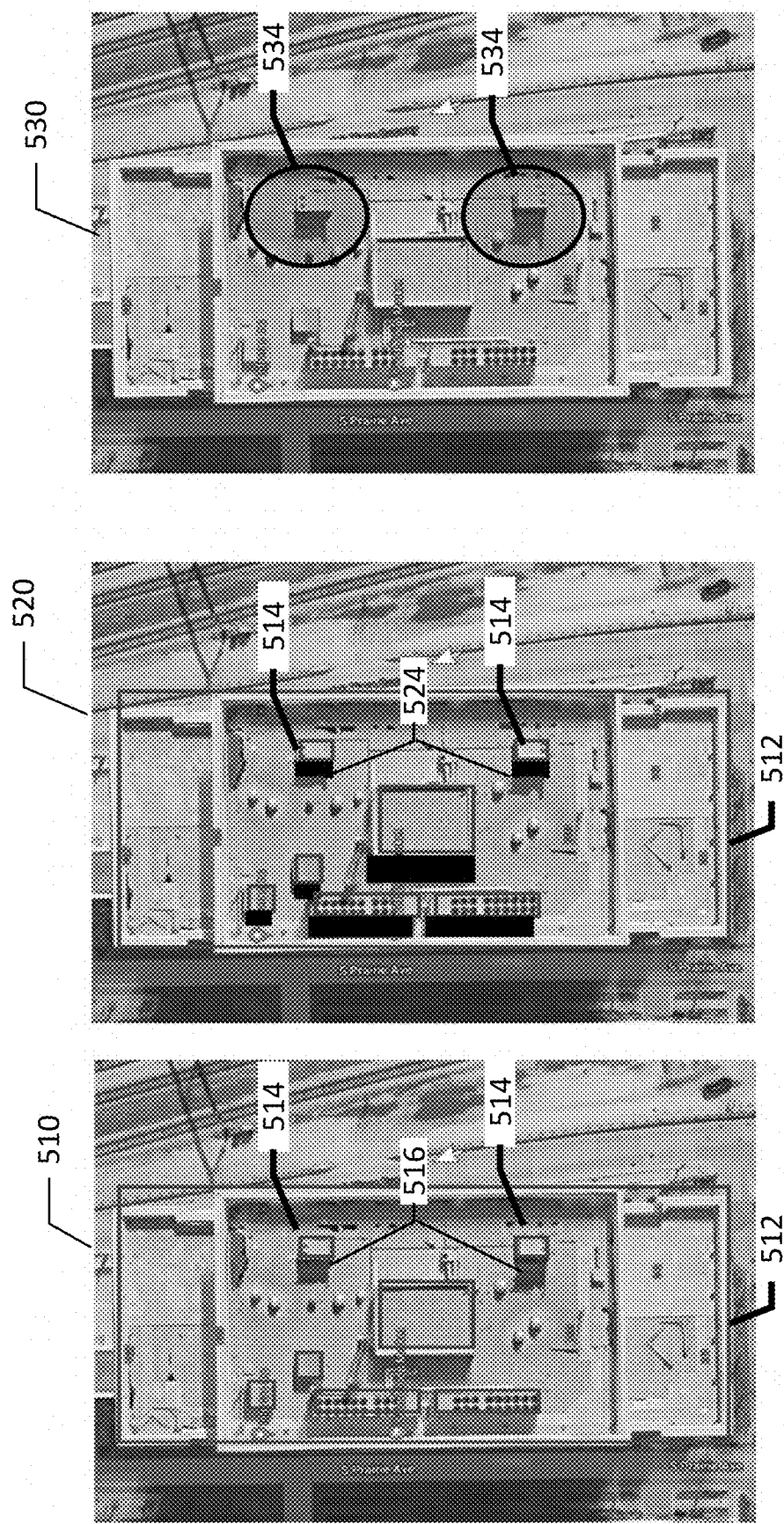
Figure 6:
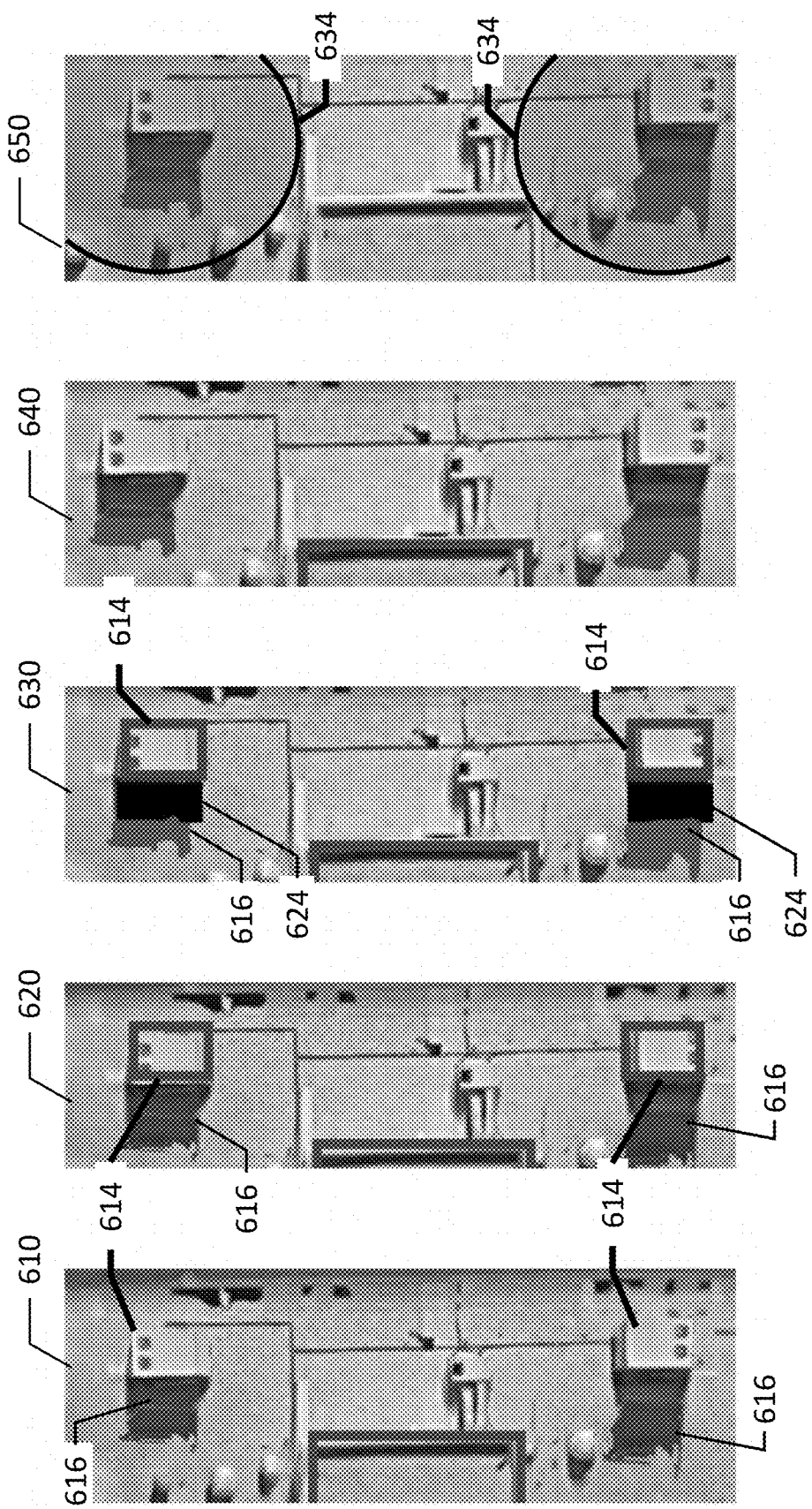
Figure 7:
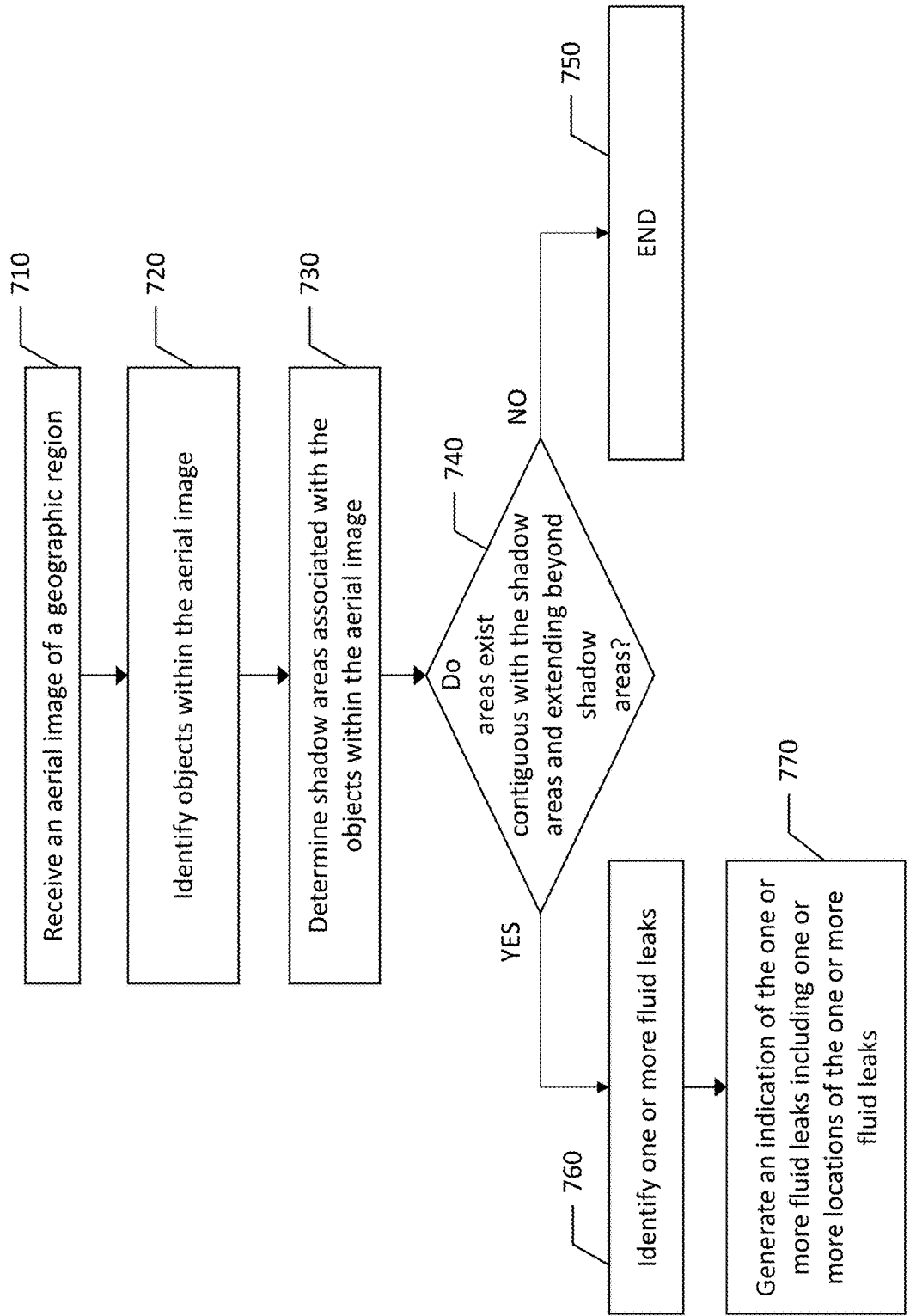

Having thus described example embodiments of the invention in general terms, reference will now be made to the accompanying drawings, which are not necessarily drawn to scale, and wherein:

FIG. 1 illustrates a communications diagram for identifying fluid leaks based on aerial imagery in accordance with an example embodiment of the present disclosure;

FIG. 2 is a block diagram of an apparatus that may be specifically configured for identifying fluid leaks from aerial imagery in accordance with an example embodiment of the present disclosure;

FIG. 3 is a flowchart of a process for identifying shadow areas associated with objects according to an example embodiment of the present disclosure;

FIG. 4 is a graphical depiction of the identification of objects and their respective shadow areas within an aerial image according to an example embodiment of the present disclosure;

FIG. 5 is a graphical depiction of the identification of fluid leaks from objects based on analysis of an aerial image according to an example embodiment of the present disclosure;

FIG. 6 is a detailed graphical depiction of the identification of fluid leaks from objects based on analysis of an aerial image according to an example embodiment of the present disclosure; and FIG. 7 is a flowchart of a method for identifying fluid leaks from aerial imagery according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for identifying fluid leaks based on aerial imagery, and more particularly, to using aerial imagery to identify and distinguish fluid leaks from objects, structures, and shadows in aerial imagery. The detection of fluid leaks, such as water leaks from building water tanks, fluid leaks from outdoor appliances, and fluid leaks from conduits (e.g., supply pipes) is often difficult, particularly when the leaks are slow leaks, out of regular view, or both. For example, water leaks from a water tank atop a building can go undetected for long periods of time and result in wasted water and loss of money when the water is replenished from a municipal source. Similarly, appliances that pump water, coolant, oil, or other fluids and conduits that carry such fluids can have leaks that can go undetected over days, weeks, or months. Embodiments described herein provide a process of automated fluid leak detection from aerial images. The processes described herein can identify leaks before they would otherwise become detectable, such as through periodic inspection or through catastrophic failure.

Building systems and industrial system that employ the conveyance of fluid or the storage of fluid generally rely on the stored or conveyed fluid as part of critical infrastructure. For example, water tanks on buildings (e.g., residential buildings in cities, single family homes where water is intermittently available, commercial/industrial buildings that store water locally, etc.) are critical infrastructure for those buildings. Water tanks should be afforded particular attention, including during the construction phase of such tanks and buildings. For example, in the case of concrete water tanks, leakage problems are likely to occur in concrete water tanks due to variable water pressure effects on their walls which can cause structural movement resulting in cracks. When water or another fluid begins to leak, the leakage can continue until an inspection occurs, which may be too infrequent to identify critical leaks, or until such time as the fluid is depleted (e.g., a water tank is emptied) having potentially serious consequences. A water tank that is relied upon for a residence or business can have a dramatic impact on the residents or business if the tank becomes depleted. In instances of water tanks for storage in remote locations (e.g., cisterns on remote residential buildings), loss of water can be a health and safety concern.

Embodiments described herein identify fluid leakages from aerial imagery. Aerial imagery is described herein as any images captured from above ground of buildings, structures, and objects on the ground. This includes images captured by satellites, aircraft, etc. Using top-bottom view aerial imagery, embodiments described herein identify all objects on buildings, such as water tanks. Detection of such objects can be performed through object detection using shadow identification since objects sitting on a surface cast shadows during at least some parts of the day. Since shadows cast are dark, it can be difficult to determine if a dark area in an image is the result of a shadow or a fluid leak. Embodiments described herein discern shadows from objects and distinguish fluid leaks from the identified shadows in aerial imagery.

To provide a method of identifying fluid leaks based on aerial imagery, a system as illustrated in FIG. 1 enables the ability to identify and distinguish fluid leaks from objects, structures, and shadows based, at least in part, on aerial imagery analysis. FIG. 1 illustrates a communication diagram of an example embodiment of a system for implementing example embodiments described herein. The illustrated embodiment of FIG. 1 includes a service provider 116, a processing server 102 in data communication with a map and/or image database, e.g., map/image database 108 through a network 112, and one or more mobile devices 114. Additional, different, or fewer components may be provided. For example, many mobile devices 114 may connect with the network 112. The service provider 116 may include computer systems and network of a system operator. The processing server 102 may include the map/image database 108, such as a remote map server. The network may be wired, wireless, or any combination of wired and wireless communication networks, such as cellular, Wi-Fi, internet, local area networks, or the like.

The map/image database 108 may include any of a variety of information types. In an example embodiment where the service provider 116 is a map services provider, the database may include map data with image layers to depict aerial views together with map data, such as road segment data or link data, point of interest (POI) data, or the like. The map/image database 108 may also include cartographic data, routing data, and/or maneuvering data. The node data may be end points corresponding to the respective links or segments of road segment data. The road link data and the node data may represent a road network, such as used by vehicles, cars, trucks, buses, motorcycles, and/or other entities. Optionally, the map/image database 108 may include building information including building profiles. Building profiles can includes building zoning, building use such as residential, commercial, industrial, and information relating to building structures such as rooftop air conditioning units, rooftop water tanks, roof-mounted antennas, satellite dishes, window washing lifts, etc. These building profiles can be embodied as point-of-interest (POI) profiles, for example. The map/image database 108 can include data about the POIs and their respective locations in the POI records. In addition, the map/image database 108 can include event data such as weather event information in order to discern when aerial imagery was captured after a storm event to better identify issues that may have resulted from the storm event (e.g., debris on a rooftop, snow and snow melt, etc.).

The map/image database 108 may be maintained by a content provider e.g., a map developer or service provider. By way of example, the map developer or service provider can collect geographic data to generate and enhance the map/image database 108. There can be different ways used by the map developer or service provider to collect data. These ways can include obtaining data from other sources, such as municipalities or respective geographic authorities.

In addition, the map developer or service provider can employ field personnel to gather information on POIs or capture information relating to aerial images through the use of drones or other image capture devices. Also, remote sensing, such as aerial or satellite photography, can be used to generate map geometries directly or through machine learning as described herein.

The map/image database 108 may be a master map/image database stored in a format that facilitates updating, maintenance, and development. For example, the master map/image database or data in the master map/image database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing image analysis functions, by a device, such as by mobile device 114, for example. Further, data may be compiled relating to aerial imagery for buildings and other infrastructure within a geographic area. The compilation to produce the end user databases can be performed by a party or entity separate from the map developer or service provider. For example, a customer of the map developer or service provider, such as a maintenance service or building management provider can perform compilation on a received map/image database in a delivery format to produce one or more compiled image databases.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The mobile device 114 can capture images such as aerial images as a drone or drone controller, for example. The server 102 may receive sensor data configured to describe a position of a mobile device, or a controller of the mobile device 114 may receive the sensor data from the positioning system of the mobile device 114 together with image data. The mobile device 114 may also include a system for tracking mobile device movement, such as rotation, velocity, or acceleration. Movement information may also be determined using the positioning system. The mobile device 114 may use the detectors and sensors to provide data indicating a location of a device such as a drone as it captures images for analysis as described herein.

An example embodiment of a processing server 102 may be embodied in an apparatus as illustrated in FIG. 2. The apparatus 200, such as that shown in FIG. 2, may be specifically configured in accordance with an example embodiment of the present disclosure for identifying fluid leaks based on aerial imagery. The apparatus 200 may include or otherwise be in communication with processing circuitry 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processing circuitry 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processing circuitry 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processing circuitry 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for using aerial imagery to determine possible fluid leaks and more particularly, a mechanism that can distinguish fluid leaks from object shadows.

The service provider 116 of example embodiments described herein uses map/image data to generate data identifying shadows cast by buildings and objects associated with buildings and other infrastructure objects. The shadows are derived in an accurate manner from raster imagery. By deriving the shadows from raster imagery, the service provider may generate the map including the buildings, objects and the shadows cast by the buildings and objects in a computationally efficient manner. Embodiments create accurate representations of the shadows with less noise and speckle from other objects, such as trees, shrubs, vehicles or the like. Thus, the resulting map data may provide for an enhanced ability to discern fluid leaks from shadows as a result of the more accurate representation of the shadows cast by the buildings and objects. The process of accurate identification of shadows cast by the buildings and other objects is described in greater detail in U.S. patent application Ser. No. 16/448,753, issued as U.S. Pat. No. 10,762,681, the contents of which are hereby incorporated by reference in their entirety.

Conventionally, fluid leaks are detected through manual checks of infrastructure and critical systems of a building. This process is inefficient, costly, and subject to error such as when service personnel overlook an issue or fail to completely inspect a system. Fluid sensors can be installed in some applications to detect when fluids are leaking from a vessel in an automated manner. However, when such vessels are outdoors, such automated leak detection may be unreliable or unmanageable depending upon the application. Embodiments described herein employ aerial imagery for a cost-effective and reliable approach to automatically identify fluid leaks using an understanding of building and object geometry through image capture and comparison.

Using aerial imagery, buildings and objects (e.g., appliances, vessels, etc. atop buildings) can be identified. Often, water tanks or other fluid vessels are situated on a roof of a building to capitalize on gravity promoting flow of fluids from the tank. Detection of such vessels on roofs can be performed using shadows and perspective views of the roof of the building. However, as these vessels do cast shadows, and as shadows are dynamic with the movement of the sun throughout the day and at different times of year, mere identification of changing shapes such as a dark area that changes is not sufficient to establish a leak. For example, fluid leaks often appear as dark spots, and shadows similarly appear dark. Thus, distinguishing between shadows and fluid leaks can be difficult. Employing the shadow detection and identification of the aforementioned incorporated patent, embodiments provided herein discern fluid leaks from shadows to accurately and repeatably identify fluid leaks.

According to an example embodiment described herein, satellite imagery is captured and all rooftop objects are identified on the roof of a building. Accurate shadows are generated, such as by service provider 116 of FIG. 1. Embodiments generate map data having accurate building shadows from raster imagery as described herein. With reference to the flowchart of FIG. 3, the service provider includes means, such as the processing circuitry 202 or the like, configured to extract pixel values from a raster image at 300 of one or more buildings, such as by raster pixel value detection. The raster image may have been previously captured and may be stored, such as by the memory device 204 of the map generation system or by a database, cloud storage or other memory device, in communication with the map generation system. Alternatively, the service provider may process the raster imagery in real time or near real time as the raster imagery is captured and provided to the map generation system in order to extract the pixel values.

Based upon the pixel values extracted from a raster image, the pixels representative of shadows are identified. As shown in block 302 of FIG. 3, the service provider includes means, such as the processing circuitry 202 or the like, for processing the pixel values that have been extracted from the raster image so as to retain pixel values within a predefined range while eliminating other pixel values. The pixel values that are retained as a result of being within the predefined range represent shadows, while those pixels having pixel value that are eliminated represent features other than shadows, such as buildings, terrain, or other objects. In an example embodiment, pixel values that represent a black color or a color very nearly black are considered to be representative of shadows. Thus, the predefined range of one embodiment includes the pixel values representative of a black color in, one embodiment, the pixel values representative of a black color and colors that are nearly black. Thus, those pixels from a raster image having pixels value representative of a black color or colors that are nearly black are retained as representative of a shadow, while other pixels having pixel values representative of lighter color are eliminated, at least for purposes of the creation of an accurate representation of the shadows.

As shown in block 304 of FIG. 3, the service provider of an example embodiment also include means, such as the processing circuitry 202, the memory device 204 or the like, for accessing a building layer representative of the size, shape, and location of one or more buildings. For example, the building layer may define 2D footprints representative of the size and shape of respective buildings with the 2D footprints positioned upon a map so as to be representative of the location of the respective buildings. The building layer may be stored by the memory device or may be stored by a database, cloud storage or other external memory device that is in communication with and may be accessed by the map generation system. The building layer may have been previously created, such as from the raster image or based upon other information. Alternatively, the building layer may be generated, such as from the raster image or from other information, at the time in which the building layer is accessed. Although the building layer may be generated in various manners, the building layer of an example embodiment may be generated, such as by the map generation system and, more particularly, by the processing circuitry, by identifying the pixels of the raster image having pixel values within a second predefined range, such as a predefined range of pixel values representative of the color(s) associated with buildings. The representations of one or more buildings within a building layer may be refined by grouping pixels having comparable pixel values into shapes representative of the corresponding shapes of one or more buildings. However, the building layer including the representations of one or more buildings may be generated in a wide variety of other manners, such as by being created manually or automatically using a geographic information system (GIS) and its software, being purchased from a vendor, etc. Also, although described herein and depicted in FIG. 3 to be performed after having processed the pixel values that have been extracted from the raster image so as to retain pixel values within a predefined range while eliminating other pixel values, the building layer may be accessed prior to processing the pixel values extracted from the raster image in other example embodiments.

In accordance with an example embodiment, the service provider of an example embodiment includes means, such as the processing circuitry 202 or the like, for modifying the representation of the shadow in order to more accurately represent the shadow cast by one or more buildings. See block 306 of FIG. 3. In this regard, the service provider, such as the processing circuitry, is configured to modify the pixel values of respective pixels based upon a shape of the one or more buildings as defined by the building layer. Thus, the representation of the shadow, as modified, has a shape corresponding to the shape of the one or more buildings. In an example embodiment, the representation of the shadow, as modified, has a shape that is identical to the shape of the one or more buildings.

Based on a determination of all shadows generated by rooftop objects, remaining dark/black regions and spots on the roof are detected using image analysis. If the spots or areas are a continuous part of the shadows of the objects, embodiments determine the presence of a fluid spot on the roof. Based on the fluid spot size, a criticality of a fluid leak can be established, with a larger spot size corresponding to a more substantial fluid leak. Embodiments can compare aerial imagery to determine differences between a detected fluid spot over time to establish a criticality level of the fluid leak.

FIG. 4 illustrates an example embodiment of identification of a building 412 in an aerial image 410. Image detection algorithms identify objects 414 on a roof of the building 412 and their respective 2D footprints illustrated by the borders of objects 414. Image 420 illustrates the representations of shadows 424 of the objects 414 on the roof of the building 412. The shadows 424 and footprints of the objects 414 are illustrated overlaid on the aerial image of the building 412 in image 430. Image 430 reflects a baseline of objects and their shadows as cast on the roof of the building. Embodiments provided herein use this baseline to establish remaining or additional areas on the rooftop that may correspond to fluid leaks.

FIG. 5 illustrates an example embodiment of the building of FIG. 4 where fluid leaks exist. As shown, the building 512 is identified in the aerial image 510 including objects on the rooftop. The shadows 516 of the objects are also captured in the aerial image. Of note, two objects 514 include shadows 516 that appear larger than in baseline image 430. The expected shadows 524 of the objects 514 are shown overlaid on the aerial image 520. The identified shadows 516 of the aerial image 510 extend beyond the expected shadows 524, such that the additional dark areas are flagged as being potential fluid leaks from objects 514 shown by highlighted areas 534.

FIG. 6 illustrates the detection process in greater detail, where an aerial image 610 is captured of a portion of the rooftop of a building. The objects 614 are identified and their shadows 516 are captured in the aerial image 620. The expected shadows 624 are shown overlaid on aerial image 630, where it is evident that the captured shadows 616 extend beyond the expected shadows. This additional dark area of the captured shadows 616 indicates that there exist dark areas that do not correspond to the shadows 624, such that a fluid leak is likely. Aerial image 640 illustrates the scope of the identified fluid leak, while aerial image 650 includes highlighted circles 634 highlighting the area where a fluid leak on the roof of the building is likely.

The severity of a fluid leak can be established based on the identified fluid leak area. If the additional dark area beyond the expected shadows of an object is relatively large, the fluid leak can be identified as a high severity requiring immediate attention or attention very soon. If the additional dark area beyond the expected shadows of an object is relatively small, the fluid leak may be identified as of minor severity requiring attention in the near future. Embodiments optionally consider environmental conditions when establishing severity of a fluid leak. For example, in a hot, dry climate, fluid may evaporate faster, such that a smaller dark area beyond the expected shadows of an object can be identified as relatively severe, as small fluid leaks may evaporate before detection.

Embodiments described herein may implement artificial intelligence and machine learning to establish fluid leaks from aerial images based on baseline aerial images and the expected or anticipated shadows as described above. Machine learning is often used to develop a particular pattern recognition algorithm (e.g., an algorithm that represents a particular pattern recognition problem, such as the determination of on-street parking described herein) that is based on statistical inference. In some embodiments, the apparatus 200, such as the processing circuitry 202 or the like, receives large quantities of data (e.g., aerial imagery) and determines whether a fluid leak exists based on pattern recognition and map matching the recognized patterns to images (e.g., building images) of a map/image database.

Pattern recognition of fluid leaks can be difficult since fluid flow is largely based on the surface on which the fluid reaches. Therefore, embodiments described herein employ a process of detecting dark areas beyond the expected shadows, not dependent upon a shape or pattern of the dark areas beyond the expected shadows. Further, according to certain embodiments, the dark area beyond the expected shadow requires some degree of continuity with the expected shadow. For example, a fluid leak from an object will have an unbroken path from the leak to the extent of the fluid pool from the leak. A dark area that is entirely separated from an object or expected shadow thereof is unlikely to be a fluid leak from the object since there is no unbroken path to reach the dark area from the object. Thus, machine learning as described herein and pattern recognition can employ a process to identify continuity in dark areas from objects to their distal edges in establishing the likelihood and scale of a fluid leak.

In some embodiments, the AI and models described herein use "deep learning". Deep learning is a subset of machine learning that generates models based on training data sets that have been provided. In some embodiments, the training model may use unsupervised learning techniques including clustering, anomaly detection, Hebbian Learning, as well as techniques for learning latent variable models such as an Expectation-maximization algorithm, a method of moments (mean, covariance), and Blind signal separation techniques, which include principal component analysis, independent component analysis, non-negative matrix factorization, and singular value decomposition.

While the aforementioned technique describes identifying fluid leaks from aerial imagery, embodiments may reinforce the confidence in identifying fluid leaks by supplementing the aerial image data analysis with other available data sources. For example, fluid sensors, manual verification by inspection, historical weather patterns (e.g., rainstorms that may leave puddles for a trailing period of time after the storm), etc.

FIG. 7 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by processing circuitry 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method of identifying fluid leaks based on aerial imagery, and more particularly, to using aerial imagery to identify and distinguish fluid leaks from objects, structures, and shadows in aerial imagery. As shown, at 710, an aerial image of a geographic region may be received. An object detection algorithm may be applied to the received aerial image at 720 to identify vehicle objects within the aerial image. Shadow areas associated with the objects within the aerial image are determined at 730. At 740 it is determined whether or not areas exist contiguous with the shadow areas and extending beyond the shadow areas. If not, the process ends at 750. However, if areas do exist that are contiguous or connected to shadow areas and extending beyond the shadow areas, one or more fluid leaks are identified at 760. At 770 an indication is generated of the one or more fluid leaks including one or more locations of the one or more fluid leaks.

In an example embodiment, an apparatus for performing the method of FIG. 7 above may comprise a processor (e.g., the processing circuitry 202) configured to perform some or each of the operations (710-770) described above. The processor may, for example, be configured to perform the operations (710-770) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-770 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

receive an aerial image of a geographic region;
identify objects within the aerial image based on identification of a first set of pixel values of the aerial image within a first predetermined range of pixel values;
determine shadow areas associated with the objects within the aerial image based on identification of a second set of pixel values of the aerial image within a second predetermined range of pixel values;
overlay one or more representations of expected shadow areas of the objects onto the aerial image;
based on the overlaid one or more representations of expected shadow areas of the objects, determine whether areas exist contiguous with the shadow areas and extending beyond the expected shadow areas;
identify one or more fluid leaks in response to areas existing contiguous with the shadow areas and extending beyond the expected shadow areas; and
generate an indication of the one or more fluid leaks including one or more locations of the one or more fluid leaks.

2. The apparatus of claim 1, wherein the aerial image of the geographic region comprises an image of a building, wherein causing the apparatus to identify objects within the aerial image comprises causing the apparatus to identify rooftop objects on a roof of the building within the aerial image.

3. The apparatus of claim 2, wherein causing the apparatus to determine shadow areas associated with the objects within the aerial image comprises causing the apparatus to determine shadow areas associated with the rooftop objects based on image analysis of the rooftop objects.

4. The apparatus of claim 1, wherein causing the apparatus to determine whether areas exist contiguous with the shadow areas and extending beyond the expected shadow areas comprises causing the apparatus to determine whether areas exist contiguous with the shadow areas and extending beyond the expected shadow areas relative to one or more baseline aerial images of the geographic region.

5. The apparatus of claim 1, wherein causing the apparatus to identify the one or more fluid leaks in response to areas existing contiguous with the shadow areas and extending beyond the expected shadow areas comprises causing the apparatus to identify a severity of the one or more fluid leaks based on a degree to which the areas existing contiguous with the shadow areas extend beyond the expected shadow areas.

6. The apparatus of claim 5, wherein causing the apparatus to generate the indication of the one or more fluid leaks including one or more locations of the one or more fluid leaks comprises causing the apparatus to:
generate an indication of the one or more fluid leaks including the one or more locations of the one or more fluid leaks and the severity of the one or more fluid leaks.

7. The apparatus claim 1, wherein causing the apparatus to generate an indication of the one or more fluid leaks including one or more locations of the one or more fluid leaks comprises causing the apparatus to provide for display of the aerial image of the geographic region including an indication of the one or more locations of the one or more fluid leaks on a user interface.

8. A computer program product comprising at least one non-transitory computer-readable storage medium having computer-executable program code portions stored therein, the computer-executable program code portions comprising program code instructions configured to:
receive an aerial image of a geographic region;
identify objects within the aerial image based on identification of a first set of pixel values of the aerial image within a first predetermined range of pixel values;
determine shadow areas associated with the objects within the aerial image based on identification of a second set of pixel values of the aerial image within a second predetermined range of pixel values;
overlay one or more representations of expected shadow areas of the objects onto the aerial image;
based on the overlaid one or more representations of expected shadow areas of the objects, determine whether areas exist contiguous with the shadow areas and extending beyond the expected shadow areas;
identify one or more fluid leaks in response to areas existing contiguous with the shadow areas and extending beyond the expected shadow areas; and
generate an indication of the one or more fluid leaks including one or more locations of the one or more fluid leaks.

9. The computer program product of claim 8, wherein the aerial image of the geographic region comprises an image of a building, wherein the program code instructions to identify objects within the aerial image comprise program code instructions to identify rooftop objects on a roof of the building within the aerial image.

10. The computer program product of claim 9, wherein the program code instructions to determine shadow areas associated with the objects within the aerial image comprise program code instructions to determine shadow areas associated with the rooftop objects based on image analysis of the rooftop objects.

11. The computer program product of claim 8, wherein the program code instructions to determine whether areas exist contiguous with the shadow areas and extending beyond the expected shadow areas comprise program code instructions to determine whether areas exist contiguous with the shadow areas and extending beyond the expected shadow areas relative to one or more baseline aerial images of the geographic region.

12. The computer program product of claim 8, wherein the program code instructions to identify the one or more fluid leaks in response to areas existing contiguous with the shadow areas and extending beyond the expected shadow areas comprise program code instructions to identify a severity of the one or more fluid leaks based on a degree to which the areas existing contiguous with the shadow areas extend beyond the expected shadow areas.

13. The computer program product of claim 12, wherein the program code instructions to generate the indication of the one or more fluid leaks including one or more locations of the one or more fluid leaks comprise program code instructions to:
generate an indication of the one or more fluid leaks including the one or more locations of the one or more fluid leaks and the severity of the one or more fluid leaks.

14. The computer program product claim 8, wherein the program code instructions to generate an indication of the one or more fluid leaks including one or more locations of the one or more fluid leaks comprise program code instructions to provide for display of the aerial image of the geographic region including an indication of the one or more locations of the one or more fluid leaks on a user interface.

15. A method comprising:
receiving an aerial image of a geographic region;
identifying objects within the aerial image based on identification of a first set of pixel values of the aerial image within a first predetermined range of pixel values;
determining shadow areas associated with the objects within the aerial image based on identification of a second set of pixel values of the aerial image within a second predetermined range of pixel values;
overlaying one or more representations of expected shadow areas of the objects onto the aerial image;
based on the overlaid one or more representations of expected shadow areas of the objects, determining whether areas exist contiguous with the shadow areas and extending beyond the expected shadow areas;
identifying one or more fluid leaks in response to areas existing contiguous with the shadow areas and extending beyond the expected shadow areas; and
generating an indication of the one or more fluid leaks including one or more locations of the one or more fluid leaks.

16. The method of claim 15, wherein the aerial image of the geographic region comprises an image of a building, wherein identifying objects within the aerial image comprises identifying rooftop objects on a roof of the building within the aerial image.

17. The method of claim 16, wherein determining shadow areas associated with the objects within the aerial image comprises determining shadow areas associated with the rooftop objects based on image analysis of the rooftop objects.

18. The method of claim 15, wherein determining whether areas exist contiguous with the shadow areas and extending beyond the expected shadow areas comprises determining whether areas exist contiguous with the shadow areas and extending beyond the expected shadow areas relative to one or more baseline aerial images of the geographic region.

19. The method of claim 15, wherein identifying the one or more fluid leaks in response to areas existing contiguous with the shadow areas and extending beyond the expected shadow areas comprises identifying a severity of the one or more fluid leaks based on a degree to which the areas existing contiguous with the shadow areas extend beyond the expected shadow areas.

20. The method of claim 19, wherein generating the indication of the one or more fluid leaks including one or more locations of the one or more fluid leaks comprises:
generating an indication of the one or more fluid leaks including the one or more locations of the one or more fluid leaks and the severity of the one or more fluid leaks.

* * * * *